United States Patent
Yamauchi (10) Patent No.: US 9,215,137 B2
(45) Date of Patent: Dec. 15, 2015

(54) RELAY DEVICE, RELAY METHOD, AND RELAY PROCESSING PROGRAM

(75) Inventor: Toshiro Yamauchi, Tokyo (JP)

(73) Assignee: NEC Corporation, Tokyo (JP)

( * ) Notice: Subject to any disclaimer, the term of this patent is extended or adjusted under 35 U.S.C. 154(b) by 73 days.

(21) Appl. No.: 14/007,899

(22) PCT Filed: Mar. 29, 2012

(86) PCT No.: PCT/JP2012/058336
§ 371 (c)(1),
(2), (4) Date: Sep. 26, 2013

(87) PCT Pub. No.: WO2012/133635
PCT Pub. Date: Oct. 4, 2012

(65) Prior Publication Data
US 2014/0016481 A1    Jan. 16, 2014

(30) Foreign Application Priority Data
Mar. 30, 2011  (JP) .................. 2011-074627

(51) Int. Cl.
*H04L 12/24* (2006.01)
*H04J 3/14* (2006.01)
*H04J 3/16* (2006.01)

(52) U.S. Cl.
CPC .............. *H04L 41/0686* (2013.01); *H04J 3/14* (2013.01); *H04L 41/0654* (2013.01); *H04J 3/1623* (2013.01); *H04J 3/1635* (2013.01); *H04J 2203/006* (2013.01)

(58) Field of Classification Search
None
See application file for complete search history.

(56) References Cited

U.S. PATENT DOCUMENTS

| | | | | |
|---|---|---|---|---|
| 5,500,756 A | * | 3/1996 | Tsushima et al. | 398/181 |
| 5,570,344 A | * | 10/1996 | Fujii | 370/217 |
| 5,978,377 A | * | 11/1999 | Kim et al. | 370/395.71 |
| 6,041,062 A | * | 3/2000 | Yamato et al. | 370/465 |
| 6,055,226 A | * | 4/2000 | Verpooten | 370/222 |
| 6,088,413 A | * | 7/2000 | Autry et al. | 375/372 |
| 6,128,321 A | * | 10/2000 | Bennett et al. | 370/535 |
| 6,243,382 B1 | * | 6/2001 | O'Neill et al. | 370/395.52 |
| 6,339,587 B1 | * | 1/2002 | Mishra | 370/255 |
| 6,856,594 B1 | * | 2/2005 | Aihara et al. | 370/228 |

(Continued)

FOREIGN PATENT DOCUMENTS

| | | |
|---|---|---|
| EP | 0891052 A2 | 1/1999 |
| JP | 6-61954 A | 3/1994 |

(Continued)

OTHER PUBLICATIONS

Extended European Search Report mailed Oct. 21, 2014 in related European Appl. No. 12765967.0 (6 pgs).

(Continued)

*Primary Examiner* — Bunjob Jaroenchonwanit
(74) *Attorney, Agent, or Firm* — Foley & Lardner LLP (57) ABSTRACT

A failure is detected in a middle path of communication information received from one communication network. When the communication information received from the one communication network is relayed to another communication network, information is output to the other communication network by storing information about the failure detected from the communication information received from the one communication network in a header of communication information to be output to the other communication network.

6 Claims, 7 Drawing Sheets

(56) References Cited

U.S. PATENT DOCUMENTS

| | | | |
|---|---|---|---|
| 6,859,461 B1* | 2/2005 | Hasegawa et al. | 370/424 |
| 7,079,541 B1* | 7/2006 | Loussouarn et al. | 370/395.51 |
| 8,451,715 B1* | 5/2013 | Doshi et al. | 370/218 |
| 2001/0046239 A1* | 11/2001 | Colombo et al. | 370/474 |
| 2002/0075834 A1* | 6/2002 | Shah et al. | 370/337 |
| 2002/0176389 A1* | 11/2002 | Colombo et al. | 370/338 |
| 2004/0117339 A1* | 6/2004 | Thubert et al. | 707/1 |
| 2005/0175037 A1* | 8/2005 | Porter et al. | 370/503 |
| 2006/0002306 A1* | 1/2006 | Brown et al. | 370/241 |
| 2006/0013127 A1* | 1/2006 | Izaiku et al. | 370/225 |
| 2006/0039414 A1* | 2/2006 | Ito et al. | 370/535 |
| 2006/0077991 A1* | 4/2006 | Kawarai | 370/403 |
| 2007/0091896 A1* | 4/2007 | Liu | 370/395.5 |
| 2007/0189306 A1* | 8/2007 | Xu | 370/395.51 |
| 2008/0170493 A1* | 7/2008 | Vasseur | 370/217 |
| 2009/0036137 A1* | 2/2009 | El-Sayed et al. | 455/446 |
| 2009/0219809 A1* | 9/2009 | Freeburg et al. | 370/228 |
| 2010/0070563 A1* | 3/2010 | Baker et al. | 709/203 |
| 2010/0215054 A1* | 8/2010 | Yakov | 370/468 |
| 2012/0092995 A1* | 4/2012 | Arvidsson et al. | 370/235 |
| 2012/0099443 A1* | 4/2012 | Makishima et al. | 370/248 |
| 2014/0016481 A1* | 1/2014 | Yamauchi | 370/242 |

FOREIGN PATENT DOCUMENTS

| | | |
|---|---|---|
| JP | 7-131474 A | 5/1995 |
| JP | 2005-244470 A | 9/2005 |
| JP | 2006-135401 A | 5/2006 |

OTHER PUBLICATIONS

International Search Report, PCT/JP2012/058336, May 15, 2012, 4 pages.

* cited by examiner

RELAY DEVICE, RELAY METHOD, AND RELAY PROCESSING PROGRAM

This application is the National Phase of PCT/JP2012/058336, filed Mar. 29, 2012, which claims priority to Japanese Application No. 2011-074627, filed Mar. 30, 2011, the disclosures of which are hereby incorporated by reference in their entirety.

TECHNICAL HELD

The present invention relates to a relay device, a relay method, and a program for storing and relaying failure occurrence information in communication information when a failure occurs in received communication information.

BACKGROUND ART

There is a relay device which relays communication information flowing through a different communication network. When the relay device relays communication information flowing through one communication network to another communication network, the communication information of the one communication network is encapsulated and transmitted to the other communication network. Here, when a failure has occurred in the one communication network, failure occurrence information is configured to be stored in the communication information flowing through the communication network. Accordingly, when the communication information including the failure occurrence information is relayed to the other communication network, the communication information is configured to be encapsulated and relayed.

However, when the failure has occurred in the one communication network, not all failure occurrence information is stored in communication information flowing through the communication network. For example, information about signal degradation may not be stored in communication information. Accordingly, even when the signal degradation information flows through another different communication network in the above-described situation, a field in which the signal degradation information is stored in communication information flowing through the other communication network is usually absent.

For example, there is no storage area for storing signal degradation information in a synchronous digital hierarchy (SDH) network. Even when the signal degradation information generated in one network is caused to be transmitted within the SDH network, the transmission is difficult. This becomes problematic when a protection path across the SDH network and another network is configured.

Technology for detecting failure occurrence in a relay device is described in Patent document 1.

DOCUMENT OF THE PRIOR ART

Patent Document

[Patent Document 1]
Japanese Unexamined Patent Application, First Publication No. H6-61954

DISCLOSURE OF INVENTION

Problems to be Solved by the Invention

Figure 7:
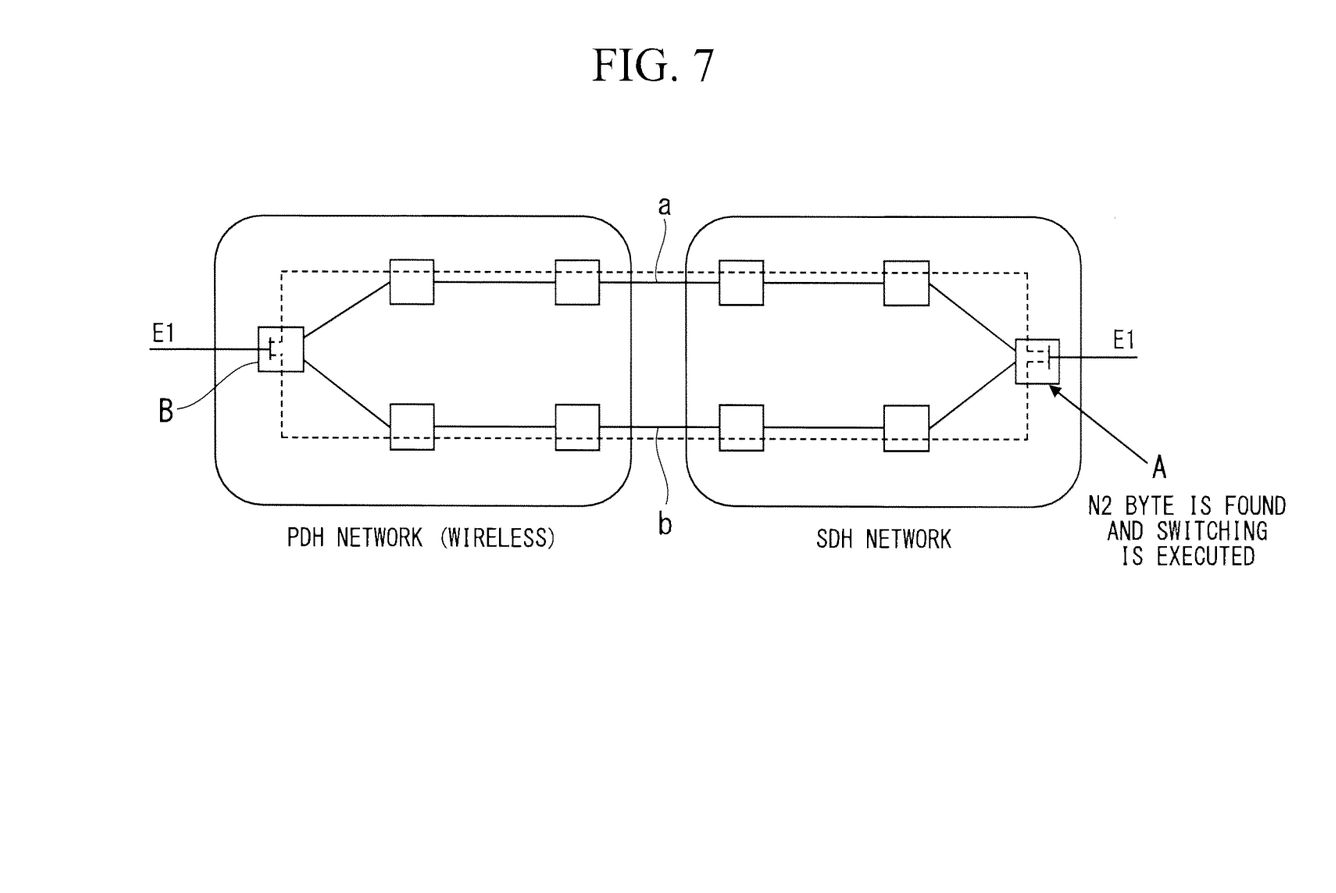
FIG. 7 is a diagram illustrating an example of a communication network configured by a PDH network and an SDH network.

FIG. 7 is a diagram illustrating an example of a communication network configured by a plesiochronous digital hierarchy (PDH) network and an SDH network.

When the communication network as in this drawing is a double network configuration of paths a and b for path protection across a PDH network section and an SDH network section, it is difficult to notify the SDH network section of a failure occurring in the PDH network section and to accurately perform a network switching operation for the path protection.

This is because it is difficult for an error detection mechanism of SDH to detect signal degradation of an E1 signal due to encapsulation in a state in which signal degradation remains when the E1 signal is encapsulated in SDH at the entrance of the SDH network even when the signal degradation occurs in the E1 signal in the PDH network and or because an SDH overhead does not have an area in which information about the signal degradation is stored and transmitted. That is, because a termination device A, which performs a path switching operation for the path protection in the SDH network as illustrated in FIG. 7, does not detect failure occurrence information, it is difficult to perform switching of a signal transmission path for path protection based on signal degradation in the PDH network (switching from reception from a path of one side at which a failure has occurred to reception from a normal path of another side in a state in which transmission from a terminal B to paths a and b has been performed).

An object of the present invention is to provide a relay device, a relay method, and a program capable of solving the above-described problem.

Means for Solving the Problem

In order to achieve the aforementioned object, the present invention provides a relay device, which relays communication between communication networks of different communication standards, including: a failure detection unit which detects a failure in a middle path of communication information received from one communication network; and a relay processing unit which outputs, when the communication information received from the one communication network is relayed to another communication network, information to the other communication network by storing information about failure occurrence detected from the communication information received from the one communication network in a header of the communication information to be output to the other communication network.

In addition, the present invention provides a relay method for use n a relay device, which relays communication between communication networks of different communication standards, including: detecting a failure in a middle path of communication information received from one communication network; and outputting, when the communication information received from the one communication network is relayed to another communication network, information to the other communication network by storing information about the failure detected from the communication information received from the one communication network in a header of the communication information to be output to the other communication network.

In addition, the present invention provides a program for causing a computer of a relay device, which relays communication between communication networks of different communication standards, to function as: a failure detection means which detects a failure in a middle path of communication information received from one communication network; and a relay processing means which outputs, when the communication information received from the one commu- nication network is relayed to another communication network, information to the other communication network by storing information about the failure detected from the communication information received from the one communication network in a header of the communication information to be output to another communication network.

Effects of Invention

According to the present invention, it is possible to easily detect whether currently relayed communication information is information including failure occurrence during a relay operation within another communication network of a different communication standard in a relay device other than a terminal node within one communication network.

EMBODIMENTS FOR CARRYING OUT THE INVENTION

Hereinafter, a communication network including a relay device according to an embodiment of the present invention will be described with reference to the drawings.

Figure 1:
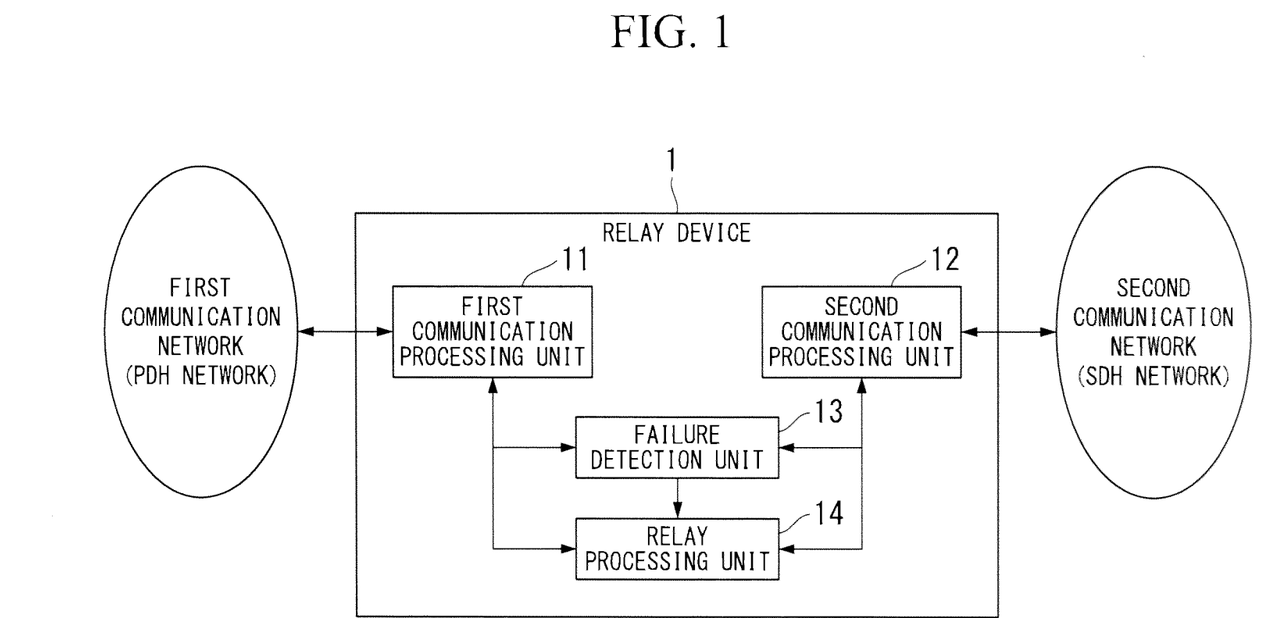
FIG. 1 is a diagram illustrating a configuration of a communication network including a relay device.

FIG. 1 is a diagram illustrating a configuration of the communication network including the relay device according to the same embodiment.

In this drawing, reference sign 1 denotes the relay device which relays communication between communication networks. The relay device 1 includes a first communication processing unit 11, which transmits and receives communication information to and from a first communication network, and a second communication processing unit 12, which transmits and receives communication information to and from a second communication network. Each of the first communication processing unit 11 and the second communication processing unit 12 may include a plurality of communication ports. A plurality of first communication processing units 11 and a plurality of second communication processing units 12, each of which has one communication port, may be included within the relay device 1.

In addition, the relay device 1 includes a failure detection unit 13 which detects a failure in a middle path of communication information received from the first communication network or the second communication network. In addition, the relay device 1 includes a relay processing unit 14, which outputs information to another communication network by storing information about the detected failure in a header of the received communication information when the communication information received from the first communication network or the second communication network is relayed to the other communication network.

In this embodiment, the relay device 1 can perform a relay operation between communication networks of different communication standards. The networks of the different communication standards are assumed to be an SDH network and a PDH network. In this embodiment, the first communication network is assumed to be the PDH network and the second communication network is assumed to be the SDH network. In addition, an example in which communication is performed using a synchronous transport module level-1 (STM-1) line in the SDH network and communication is performed using a wireless E1 line in the PDH network will be described in this embodiment.

In the relay device 1 of this embodiment, the failure detection unit 13 detects a failure in the wireless E1 line. In addition, when the failure has been detected, the relay processing unit 14 in the relay device 1 performs a process of encapsulating communication information of the wireless E1 line received from the PDH network and then storing failure occurrence information in an N2 byte field within a header of the encapsulated communication information transmitted through the STM-1 line.

Alternatively, in the relay device 1 of this embodiment, the failure detection unit 13 detects the failure using an error monitoring bit stored in communication information of the STM-1 line. When the failure has been detected, the relay processing unit 14 in the relay device 1 performs a process of converting the communication information of the STM-1 line received from the SDH network into communication information of the E1 line, and storing failure occurrence information in a failure occurrence information storage field within a header of the converted communication information.

Through the above-described process, the communication network using the relay device 1 of this embodiment provides a function of detecting that communication information to be relayed is communication information in which a failure is likely to occur in a middle communication path before a relay operation even in a relay device other than a terminal node.

Figure 2:
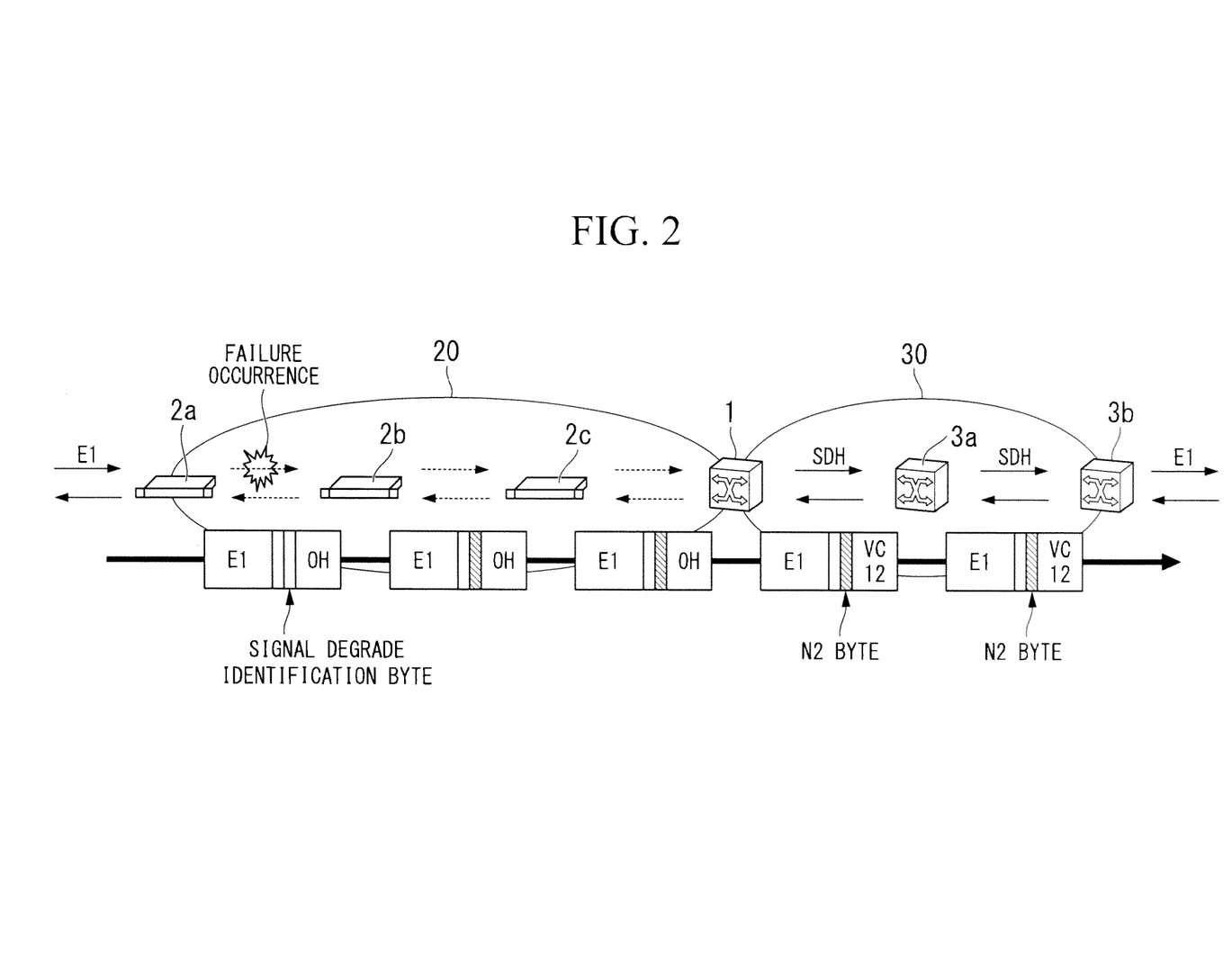
FIG. 2 is a diagram of an example illustrating an outline of an operation of relaying communication information in a communication network.

FIG. 2 is a diagram of an example illustrating an outline of an operation of relaying communication information in a communication network.

Figure 3:
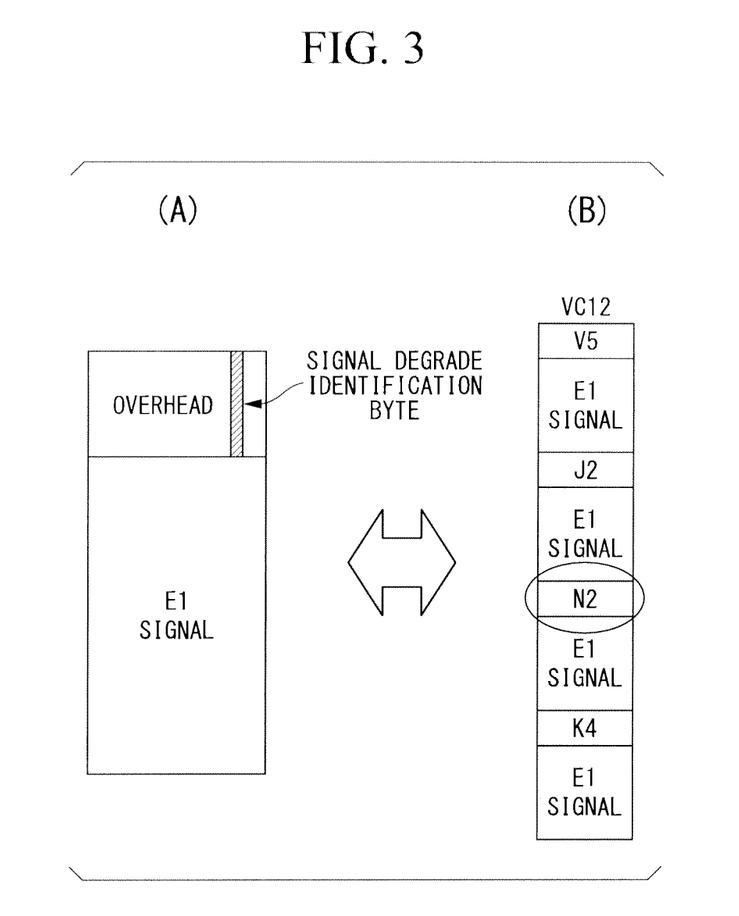
FIG. 3 is a diagram illustrating a data example of a packet of communication information to be relayed in the communication network.

FIG. 3 is a diagram illustrating a data example of a packet of communication information to be relayed in the communication network.

Figure 4:
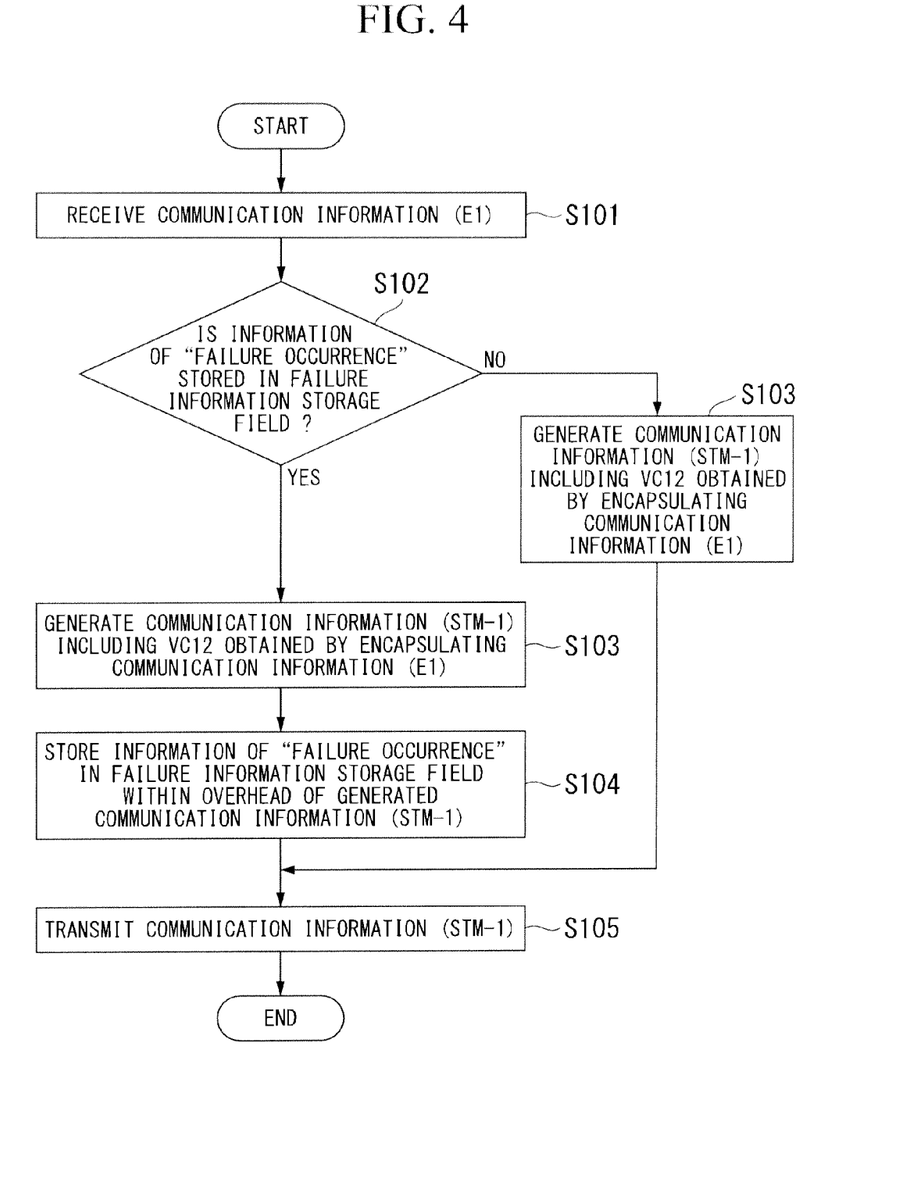
FIG. 4 is a diagram illustrating a processing flow of a relay device.

FIG. 4 is a diagram illustrating a processing flow of the relay device.

As illustrated in FIG. 2, the communication network includes a PDH network 20 using the wireless E1 line and an SDH network 30 using a wired STM-1 line. Accordingly, the relay device 1 performs a relay operation between the PDH network 20 and the SDH network 30 in the communication network. Relay devices that perform the relay operation within the PDH network 20 are represented by reference signs 2a, 2b, and 2c (collectively referred to as a relay device 2). Relay devices that perform the relay operation within the SDH network 30 are represented by reference signs 3a and 3b (collectively referred to as a relay device 3).

First, an example in which communication information is relayed from the PDH network 20 to the SDH network 30 will be described using FIG. 2.

Communication information (E1) to be relayed through the wireless E1 line is transmitted to the relay device 1 via the relay device 2. During the relay operation, for example, some failure is assumed to have occurred between the relay device 2a and the relay device 2b as illustrated in FIG. 2. Here, the relay device 2b performs a process of detecting whether a failure has occurred in communication information (E1) using an error correction code or the like in terms of the communication information (E1) received from the relay device 2a. Accordingly, when some failure has occurred between the relay device 2a and the relay device 2b, the relay device 2b detects the failure occurrence. When the failure occurrence is detected, the relay device 2b stores information indicating the failure occurrence in the failure information storage field within the overhead of the communication information (E1) received from the relay device 2a. Accordingly, the communication information (E1) including the failure occurrence information (failure occurrence) is transmitted to the relay device 2c.

Here, in the communication information (E1) flowing through the PDH network 20 using the E1 line, the failure information storage field within the overhead is referred to as a "Signal Degrade identification byte." By establishing bits of the "Signal Degrade identification byte," the failure occurrence information is stored in the communication information (E1). Because no failure occurs between the relay device 2b and the relay device 2c when the communication information (E1) including the failure occurrence information is received, the relay device 2c directly transmits the communication information (E1) including the failure occurrence information to the relay device 1.

Next, in the relay device 1 which relays communication between communication networks of different communication standards, the first communication processing unit 11 receives communication information (E1) (step S101). Then, the failure detection unit 13 determines whether information of "failure occurrence" is stored in the failure information storage field within an overhead of the received communication information (E1) (step S102). When the failure occurrence has been detected, the failure detection unit 13 outputs information indicating "failure occurrence" to the relay processing unit 14. In addition, when no failure occurrence has been detected, the failure detection unit 13 outputs the information indicating "no failure occurrence" to the relay processing unit 14.

On the other hand, in order to output the communication information (E1) received by the first communication processing unit 11 to the SDH network 30 of a different standard, the relay processing unit 14 of the relay device 1 generates communication information (STM-1) including a VC12 obtained by encapsulating the communication information (E1) (step S103). Accordingly, the relay processing unit 14 stores the information of "failure occurrence" in the failure information storage field within the overhead of the generated communication information (STM-1) only when the information of "failure occurrence" has been input from the failure detection unit 13 (step S104). More specifically, in an N2 byte within a VC12 path overhead of the communication information (STM-1), "0xAA" is stored as the information of "failure occurrence." The relay processing unit 14 of the relay device 1 outputs the generated communication information (STM-1) to the second communication processing unit 12, and the second communication processing unit 12 transmits the communication information (STM-1) to the relay device 3a. The relay device 3a transmits the communication information (STM-1) received from the relay device 1 to the relay device 3b (step S105).

According to the above process, in the relay device 3a or the relay device 3b other than the terminal node within the SDH network 30, it is possible to detect whether the currently relayed communication information (STM-1) is information including failure occurrence during a relay operation within the PDH network 20.

For example, it is assumed that the relay device 3b transmits the communication information to a first path when the communication information is communication information in which no failure has occurred in a middle path in another communication network of a different communication standard and transmits the communication information to a second path when the communication information is communication information including a failure occurring in the middle path in the other communication network of the different communication standard, Even in this case, the relay device 3b is set to easily recognize whether the failure has occurred in the other communication network of the different communication standard and thus transmit the communication information to a correct path.

Also, the failure detection unit 13 of the relay device 1 in the above-described process reads information of the failure occurrence information storage field of the communication information (E1) and detects whether the failure has occurred from the information. However, whether the failure has occurred in the wireless communication information (E1) may be detected using an error correction code of a cyclic redundancy check (CRC) or the like instead of the above-described technique of detecting whether the failure has occurred. In the above-described case, it is not necessary to store information indicating "failure occurrence" in the failure occurrence information storage field of the communication information (E1).

In addition, although an example in which the failure occurrence information storage field is the "Signal Degrade identification byte" has been described in the above-described process, there may be a "Signal Failure identification byte" within the communication information instead of the "Signal Degrade identification byte" or along with the "Signal Degrade identification byte." For example, when no communication information has been received even when a predetermined time has elapsed, this fact is detected in a process of detecting failure occurrence, and information indicating "failure occurrence" is stored in the "Signal Failure identification byte" instead of the "Signal Degrade identification byte."

FIG. 3(A) illustrates a data packet example of the communication information (E1), and FIG. 3(B) illustrates a data packet example of the communication information (STM-1).

Figure 5:
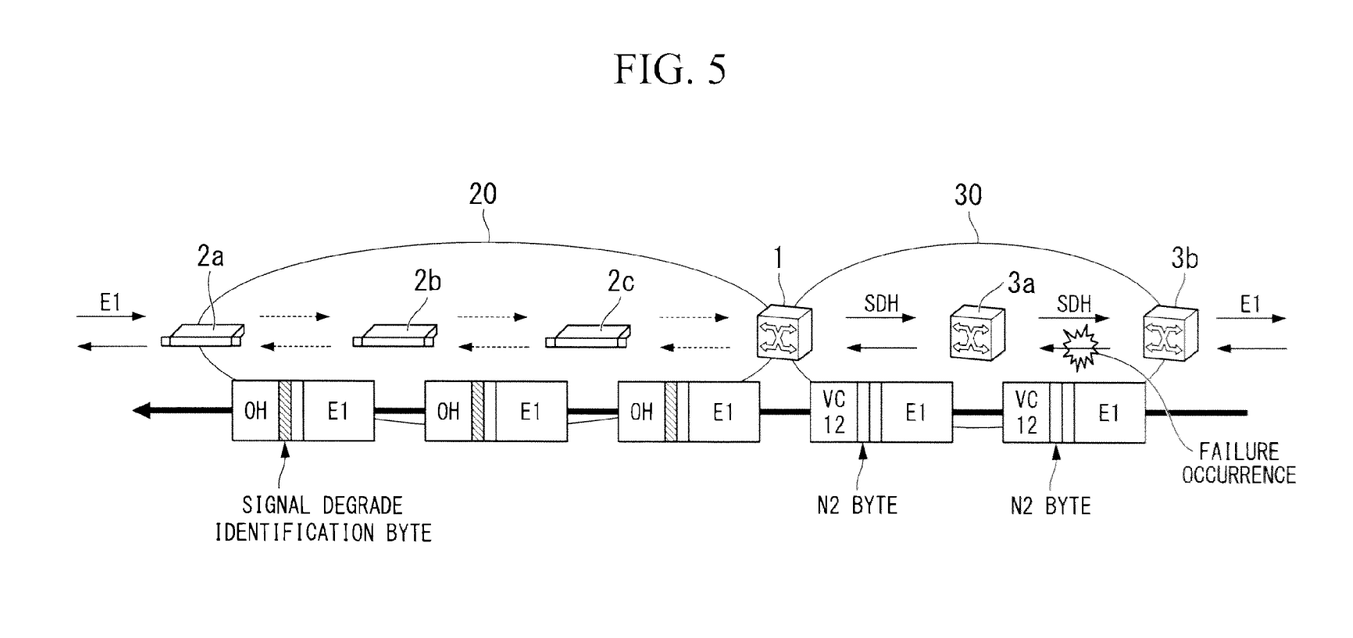
FIG. 5 is a diagram illustrating an outline of an operation of relaying communication information in a communication network.

FIG. 5 is a diagram illustrating an outline of an operation of relaying communication information in a communication network.

Figure 6:
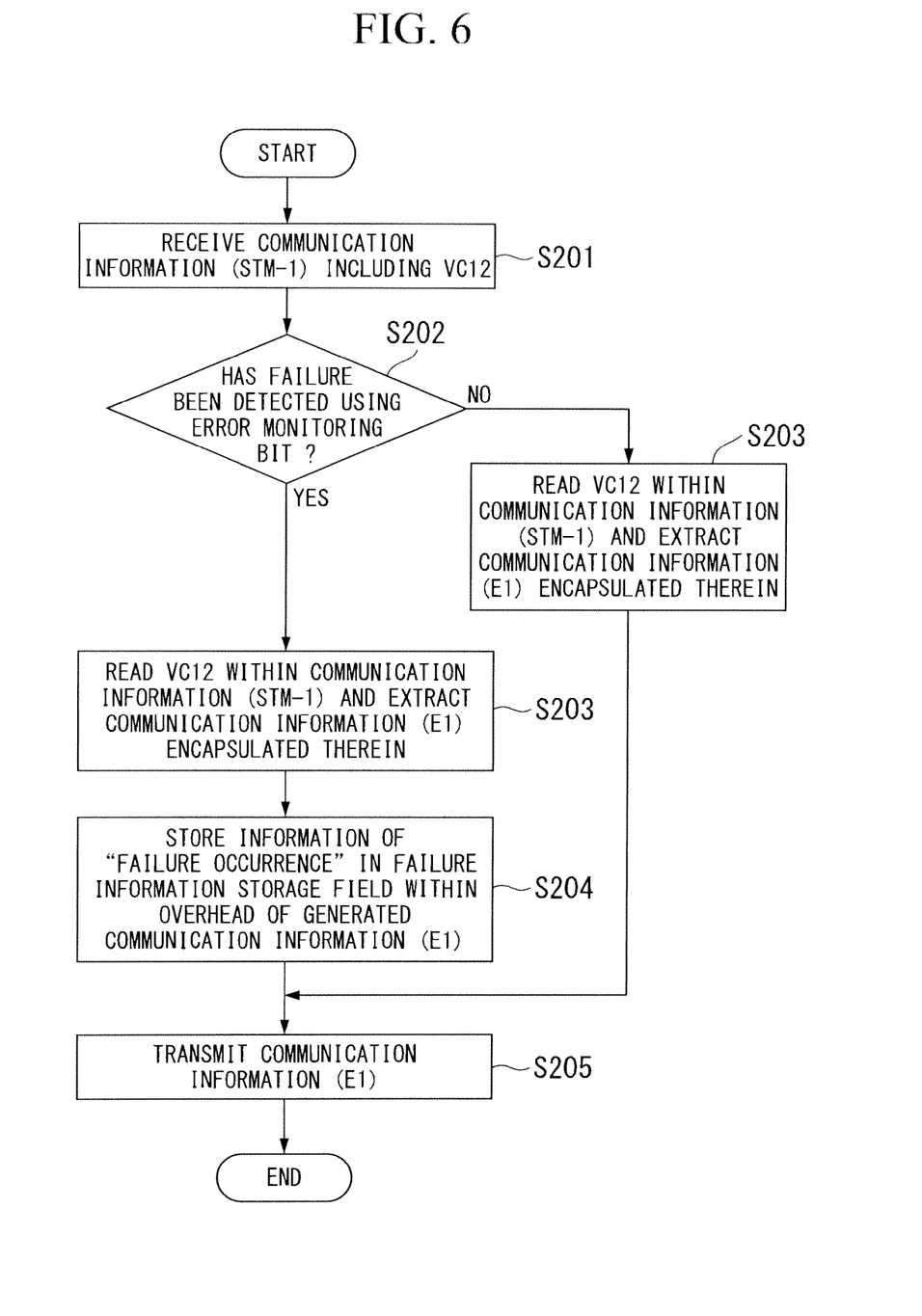
FIG. 6 is a diagram illustrating a processing flow of a relay device.

FIG. 6 is a diagram illustrating a processing flow of the relay device.

The communication network configuration illustrated in FIG. 5 is the same as the communication network illustrated in FIG. 2. Using a wired STM-1 line, the SDH network 30 is mixed with the PDH network 20 using the wireless E1 circuit.

An example in which communication information is relayed from the SDH network 30 to the PDH network 20 will be described using FIGS. 5 and 6.

Communication information (STM-1) relayed from the SDH network 30 using the STM-1 line is assumed to be transmitted to the relay device 1 via the relay device 3. For example, some failure is assumed to have occurred between the relay device 3b and the relay device 3a as illustrated in FIG. 5 during the relay operation. The communication information (STM-1) including failure occurrence is transmitted from the relay device 3a to the relay device 1.

Next, in the relay device 1 which relays communication between communication networks of different communication standards, the second communication processing unit 12 receives communication information (STM-1) including a virtual container-12 (VC12) (step S201). Then, the failure detection unit 13 detects a failure using an error monitoring bit stored in the received communication information (STM-1) including the VC12 and determines whether the failure has been detected (step S202). Specifically, it is detected whether "Signal Degrade" has occurred through an error correction code or the like using an error monitoring bit of a V5 byte of the VC12 path overhead. When it is detected that "Signal Degrade" has occurred, that is, when a failure occurrence has been detected, the failure detection unit 13 outputs information indicating "failure occurrence" to the relay processing unit 14. In addition, when no "Signal Degrade" has occurred, that is, when no failure occurrence has been detected, the failure detection unit 13 outputs information indicating "no failure occurrence" to the relay processing unit 14.

On the other hand, in order to output the communication information (STM-1) received by the second communication processing unit 12 to the PDH network 20 of a different standard, the relay processing unit 14 of the relay device 1 reads the VC12 within the communication information (STM-1) and reads and outputs communication information (E1) encapsulated therein (step S203). Accordingly, the relay processing unit 14 stores the information of "failure occurrence" in the failure information storage field within the overhead of the read communication information (E1) only when the information of "failure occurrence" has been received from the failure detection unit 13 (step S204). More specifically, by establishing hits of a "Signal Degrade identification byte" which is the failure information storage field of the communication information (E1), the failure occurrence information is stored in the communication information (E1). Accordingly, the relay processing unit 14 of the relay device 1 outputs the communication information (E1) to the first communication processing unit 11, and the first communication processing unit 11 transmits the communication information (E1) to the relay device 2c (step S205). The relay device 2c transmits the communication information (E1)) received from the relay device 1 to the relay device 2b.

According to the above process, in the relay devices 2a to 2c other than the terminal node within the PDH network 20, it is possible to detect whether currently relayed communication information (E1) is information including a failure occurrence during a relay operation within the SDH network 30.

Also, the above-described relay device internally includes a computer system. Each process described above may be stored in a computer-readable recording medium in the form of a program. The above-described process is performed by the computer reading and executing the program. Here, the computer-readable recording medium may be a magnetic disk, a magneto-optical disc, a compact disc read-only memory (CD-ROM), a digital versatile disc-read only memory (DVD-ROM), a semiconductor memory, or the like. In addition, the computer program may be distributed to the computer through a communication line, and the computer receiving the distributed program may execute the program.

The above-described program may be used to implement some of the above-described functions.

Further, the program may be a differential file (differential program) capable of implementing the above-described functions in combination with a program already recorded on the computer system.

INDUSTRIAL APPLICABILITY

It is possible to provide a relay device of a communication network capable of easily detecting whether currently relayed communication information is information including failure occurrence during a relay operation of another communication network of a different communication standard.

DESCRIPTION OF REFERENCE SYMBOLS

1 Relay device
2a Relay device
2b Relay device
2c Relay device
3a Relay device
3b Relay device
11 First communication processing unit
12 Second communication processing unit
13 Failure detection unit
14 Relay processing unit
20 PDH network
30 SDH network

The invention claimed is:

1. A relay device, which relays communication between communication networks of different communication standards, comprising:
   a failure detection unit which detects a failure in a middle path of communication information received from one communication network; and
   a relay processing unit which outputs, when the communication information received from the one communication network is relayed to another communication network, communication information storing information about failure occurrence detected from the communication information received from the one communication network in a header of the communication information to the other communication network,
   the one communication network being a wireless E1 line which forms a PDH network, the other communication network being an STM-1 line which forms an SDH network, the failure detection unit detects the failure in the wireless E1 line, and when the failure has been detected, the relay processing unit encapsulates communication information of the wireless E1 line received from the PDH network and stores the failure occurrence information in an N2 byte field within a header of the encapsulated communication information, and the relay processing unit transmits the encapsulated communication information through the STM-1 line.

2. The relay device according to claim 1, the failure detection unit receives the communication information from a synchronous transport module level-1 (STM-1) line which forms a synchronous digital hierarchy (SDH) network and the relay processing units transmits the encapsulated communication information through an E1 line which forms a plesiochronous digital hierarchy (PDH) network.

3. The relay device according to claim 1,
   the failure detection unit receives communication information from an STM-1 line which forms the SDH network, and detects the failure using an error monitoring bit stored in the communication information of the STM-1 line, and when the failure has been detected, the relay processing unit converts communication information of the STM-1 line received from the SDH network into communication information of a wireless E1 line which forms the PDH network and stores the failure occurrence information in a failure occurrence information storage field within a header of the converted communication information.

4. A relay method for use in a relay device, which relays communication between communication networks of different communication standards, comprising:
- detecting a failure in a middle path of communication information received from one communication network; and
- outputting, when the communication information received from the one communication network is relayed to another communication network, communication information by storing information about the failure detected from the communication information received from the one communication network in a header of the communication information to the other communication network,
- the one communication network being a wireless E1 line which forms a PDH network, the other communication network being an STM-1 line which forms an SDH network, the failure detection unit detects the failure in the wireless E1 line, and when the failure has been detected, the relay processing unit encapsulates communication information of the wireless E1 line received from the PDH network and stores the failure occurrence information in an N2 byte field within a header of the encapsulated communication information, and the relay processing unit transmits the encapsulated communication information through the STM-1 line.

5. The relay method according to claim 4, the failure is detected from an STM-1 line which forms the SDH network using an error monitoring bit stored in communication information of the STM-1 line in the detecting of the failure, and when the failure has been detected, communication information of the STM-1 line received from the SDH network is converted into communication information of an E1 line which forms the PDH network and failure occurrence information is stored in a failure occurrence information storage field within a header of the converted communication information in relay processing.

6. A non-transitory medium [storing] stored thereon, a program for causing a computer of a relay device, which relays communication between communication networks of different communication standards, to function as:
- a failure detection means which detects a failure in a middle path of communication information received from one communication network; and
- a relay processing means which outputs, when the communication information received from the one communication network is relayed to another communication network, communication information storing information about the failure detected from the communication information received from the one communication network in a header of the communication information to another communication network,
- the one communication network being a wireless E1 line which forms a PDH network, the other communication network being an STM-1 line which forms an SDH network, the failure detection unit detects the failure in the wireless E1 line, and when the failure has been detected, the relay processing unit encapsulates communication information of the wireless E1 line received from the PDH network and stores the failure occurrence information in an N2 byte field within a header of the encapsulated communication information, and the relay processing unit transmits the encapsulated communication information through the STM-1 line.

* * * * *